(12) United States Patent
Miyamoto et al.

(10) Patent No.: US 8,284,573 B2
(45) Date of Patent: Oct. 9, 2012

(54) SYNCHRONOUS RECTIFIER CIRCUIT CAPABLE OF PREVENTING FLOW-THROUGH CURRENT

(75) Inventors: Hitoshi Miyamoto, Daito (JP); Takashi Jinnouchi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 353 days.

(21) Appl. No.: 12/690,399

(22) Filed: Jan. 20, 2010

(65) Prior Publication Data

US 2010/0182807 A1 Jul. 22, 2010

(30) Foreign Application Priority Data

Jan. 21, 2009 (JP) ................................. 2009-011241

(51) Int. Cl.
*H02M 3/335* (2006.01)
(52) U.S. Cl. .................. 363/21.14; 363/21.06
(58) Field of Classification Search .............. 363/20, 363/21.04, 21.06, 21.12, 21.14, 37, 53
See application file for complete search history.

(56) References Cited

U.S. PATENT DOCUMENTS

| 4,384,287 | A | * | 5/1983 | Sakuma | 345/60 |
| 5,155,648 | A | * | 10/1992 | Gauthier | 361/58 |
| 7,196,920 | B2 | * | 3/2007 | Quitayen | 363/127 |
| 7,212,416 | B2 | * | 5/2007 | Kyono | 363/21.14 |
| 2005/0207188 | A1 | * | 9/2005 | Takashima et al. | 363/21.14 |

FOREIGN PATENT DOCUMENTS

| JP | 2002-199713 A | 7/2002 |
| JP | 2002-335675 A | 11/2002 |
| JP | 2007-166794 A | 6/2007 |

* cited by examiner

*Primary Examiner* — Adolf Berhane
*Assistant Examiner* — Emily Pham
(74) *Attorney, Agent, or Firm* — Crowell & Moring LLP

(57) ABSTRACT

A synchronous rectifier circuit (DC-DC converter) includes a CR integration circuit and a discharge circuit. The CR integration circuit outputs a voltage that varies at delayed timing as compared with a voltage induced in a secondary-side main winding. The discharge circuit discharges a gate voltage of a rectifier transistor as a result of conduction of a discharge transistor in response to the output voltage from the CR integration circuit. According to such a configuration, the rectifier transistor is turned off earlier than the timing of switching of polarity of voltages induced in the secondary-side main winding and a secondary-side auxiliary winding in response to turn-on of a primary-side transistor.

1 Claim, 5 Drawing Sheets

SYNCHRONOUS RECTIFIER CIRCUIT CAPABLE OF PREVENTING FLOW-THROUGH CURRENT

BACKGROUND OF THE INVENTION

1. Field of the Invention

The present invention relates to a synchronous rectifier circuit.

2. Description of the Background Art

A DC-DC converter (a switching power supply) may suffer from heat generation by a forward voltage of a rectifier diode. In order to address this, a synchronous rectification DC-DC converter including a MOSFET (Metal-Oxide Semiconductor Field-Effect Transistor) low in ON resistance has been developed instead of the rectifier diode.

For example, Japanese Patent Laying-Open No. 2007-166794 discloses a technique for reducing electric power loss by achieving a faster OFF operation of a rectifier MOSFET. According to this technique, for driving the rectifier MOSFET, a third winding of a transformer, a rectifier circuit connected to the third winding, and an inductor and an impedance element connected to an output side thereof are provided. In turning off the rectifier MOSFET, energy stored in the inductor is released through a rectifier circuit. Consequently, charges in a gate capacitance of the rectifier MOSFET are rapidly released.

Japanese Patent Laying-Open No. 2002-335675 discloses a technique relating to a forward-type synchronous rectification DC-DC converter. The DC-DC converter described in this document includes a main switching element provided on a primary side of a transformer, respective switching elements for rectification and commutation provided on a secondary side, and first and second auxiliary windings for driving the switching elements for rectification and commutation in synchronization with switching on the primary side, respectively. Further, a transformer reset circuit for clamping a voltage waveform of an output from the second auxiliary winding is provided in parallel to the second auxiliary winding. The transformer reset circuit resets, during a commutation period in which the main switching element is in the OFF state, excitation energy accumulated in the transformer during a rectification period in which the main switching element is in the ON state.

Japanese Patent Laying-Open No. 2002-199713 discloses a technique for stopping self-oscillation of a synchronous rectifier circuit that often occurs when synchronous rectification switching power supplies are operated in parallel. A synchronous rectification type forward converter in this document includes a switch provided between a source of a rectifier MOSFET and a gate of a commutation MOSFET and a self-oscillation detection circuit of the synchronous rectifier circuit. The switch is controlled by a detection signal from the self-oscillation detection circuit and the source of the rectifier MOSFET and the gate of the commutation MOSFET are short-circuited or opened.

Synchronous rectification, however, suffers a problem of a flow-through current that flows when a MOSFET is switched with a time lag from desired timing. For example, in a forward type DC-DC converter, when a rectifier MOSFET and a commutation MOSFET are simultaneously turned on, a flow-through current flows from a high voltage side to a low voltage side. In a flyback type DC-DC converter, when a MOSFET on the primary side of a transformer is turned on while a rectifier MOSFET on the secondary side remains in the ON state, a flow-through current flows through the rectifier MOSFET because such a state is equivalent to a state where the circuit on the secondary side is short-circuited. Flow of the flow-through current may lead to breakdown of the MOSFET.

SUMMARY OF THE INVENTION

An object of the present invention is to provide a synchronous rectifier circuit capable of preventing a flow-through current.

In summary, the present invention is directed to a synchronous rectifier circuit including first and second input terminals, first and second output terminals, a transformer, a first switching element, a second switching element for rectification, a delay circuit, and a third switching element. The transformer includes first and second nodes, a primary-side main winding, provided between the first and second input terminals, a secondary-side main winding provided between the second output terminal and the first node, and a secondary-side auxiliary winding provided between the first and second nodes and wound in a direction the same as a direction of winding of the secondary-side main winding. The first switching element is provided between the first and second input terminals and connected in series to the primary-side main winding. The second switching element is provided between the first node and the first output terminal. The second switching element has a control electrode for receiving a voltage of the second node generated by switching of the first switching element or a voltage obtained by dividing the voltage of the second node and it is turned on in response to the voltage of the second node. The delay circuit receives a voltage of the first node generated by switching of the first switching element and outputs a voltage that varies at delayed timing as compared with voltage of the first node. The third switching element is provided between the control electrode of the second switching element and the second output terminal. The third switching element has a control electrode for receiving the output voltage from the delay circuit and it is turned on in response to the output voltage from the delay circuit. The second switching element is turned off in response to turn-on of the third switching element.

Preferably, the delay circuit includes a capacitive element and a resistor element. Here, the capacitive element and the resistor element are provided in series between the second output terminal and the first node in this order. A connection node of the capacitive element and the resistor element is connected to the control electrode of the third switching element.

Alternatively, preferably, the delay circuit includes a capacitive element and a Zener diode. Here, the capacitive element and the Zener diode are provided in series between the second output terminal and the first node in this order. A connection node of the capacitive element and the Zener diode is connected to the control electrode of the third switching element.

According to the present invention, the timing of turn-off of the second switching element can be controlled based on a delay time by the delay circuit. Therefore, a primary advantage of the present invention is that a flow-through current can be prevented with a simplified circuit configuration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
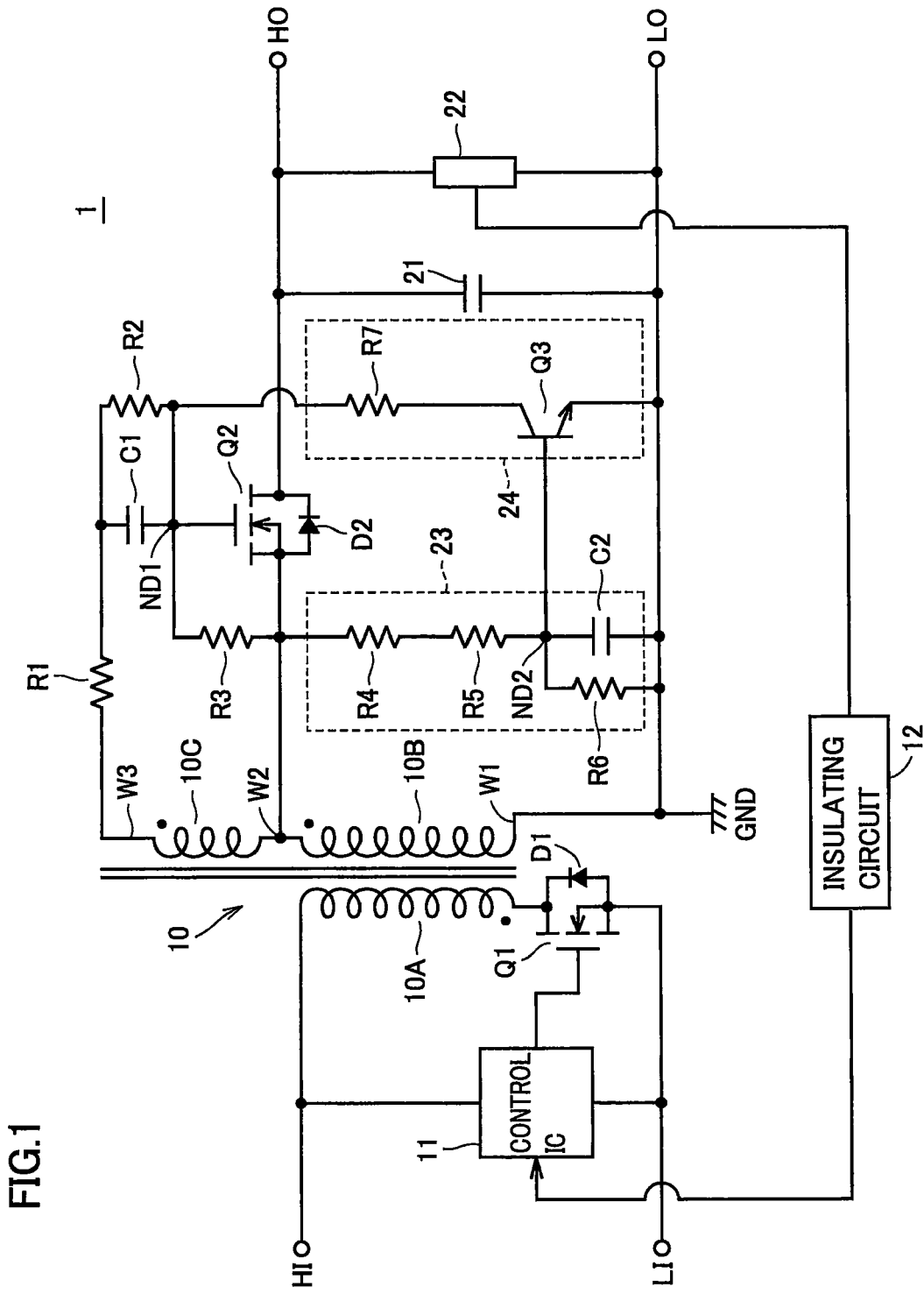
FIG. 1 is a circuit diagram showing a configuration of a synchronous rectification DC-DC converter 1 according to a first embodiment of the present invention.

An embodiment of the present invention will be described hereinafter in detail with reference to the drawings. The same or corresponding elements have the same reference characters allotted and description thereof will not be repeated.

[First Embodiment]

FIG. 1 is a circuit diagram showing a configuration of a synchronous rectification DC-DC converter 1 according to a first embodiment of the present invention. Referring to FIG. 1, DC-DC converter 1 is a flyback type DC-DC converter for converting a DC voltage input across a high-voltage side input node HI and a low-voltage side input node LI to a DC voltage of a different magnitude. The resultant DC voltage is output across a high-voltage side output node HO and a low-voltage side output node LO.

DC-DC converter 1 includes a transformer 10, an N-channel MOS transistor Q1 serving as a switching element, provided on the primary side of transformer 10, and a control IC (Integrated Circuit) 11. In addition, DC-DC converter 1 includes an N-channel MOS transistor Q2 serving as a switching element for rectification, provided on the secondary side of transformer 10, an NPN-type bipolar transistor Q3, resistor elements R1 to R7, and capacitors C1, C2, and 21. Further, DC-DC converter 1 includes a voltage detection portion 22 such as a resistor element provided between nodes HO and LO for feedback of an output voltage on the secondary side to the primary side and an insulating circuit 12.

Among the components described above, resistor elements R4, R5 and R6 and capacitor C2 constitute a delay circuit 23, and resistor element R7 and transistor Q3 constitute a discharge circuit 24. It is noted that diodes D1 and D2 connected in parallel to MOS transistors Q1 and Q2 in FIG. 1 respectively are parasitic diodes specific to a vertical MOS transistor.

Transformer 10 includes a primary-side main winding 10A, a secondary-side main winding 10B, and a secondary-side auxiliary winding 10C. Here, secondary-side auxiliary winding 10C is connected to one end of secondary-side main winding 10B with a node W2 being interposed, and wound in a direction the same as a direction of winding of secondary-side main winding 10B. Namely, secondary-side main winding 10B and secondary-side auxiliary winding 10C are connected in series between nodes W1 and W3 in this order. Here, as shown in FIG. 1, node W1 is connected to a ground node GND. In the description below, a potential of node W1 and ground node GND is assumed as a reference potential (0V).

MOS transistor Q1 is connected in series to primary-side main winding 10A and switched ON or OFF in response to a PWM (Pulse Width Modulation) signal output from control IC 11. As transistor Q1 repeats switching, a voltage like a pulse is applied to primary-side main winding 10A and thus an induced voltage is generated in secondary-side main winding 10B and secondary-side auxiliary winding 10C.

Control IC 11 adjusts a duty ratio of the PWM signal output to a control electrode of transistor Q1 based on a voltage detected by voltage detection portion 22, such that the output voltage on the secondary side is constant. In order to achieve insulation between the primary side and the secondary side of transformer 10, insulating circuit 12 such as a photocoupler is provided in a path for a feedback signal from voltage detection portion 22.

MOS transistor Q2 is a switching element for synchronous rectification, and has a source connected to node W2 and a drain connected to output node HO. In addition, transistor Q2 has a gate (a node ND1) connected to node W3 of secondary-side auxiliary winding 10C with resistor elements R2 and R1 being interposed, and connected to node W2 with resistor element R3 being interposed. Thus, a voltage obtained by dividing the voltage induced in secondary-side auxiliary winding 10C by a ratio between resistor elements R1 and R2 and resistor element R3 is applied across the gate and the source of transistor Q2.

In addition, speed-up capacitor C1 is provided in parallel to resistor element R2. Thus, when transistor Q2 is turned on, a voltage higher by a voltage charged to capacitor C1 is applied to the gate of transistor Q2. The voltage of capacitor C1 at this time is charged during an OFF period of transistor Q2 (while the potential of node W2 is higher than the potential of node W3).

Resistor elements R4 to R6 constituting delay circuit 23 are connected in series between nodes W2 and W1 in this order. In addition, capacitor C2 constituting delay circuit 23 is connected in parallel to resistor element R6. A connection node ND2 of capacitor C2 and resistor element R5 is connected to a base electrode of bipolar transistor Q3.

Capacitor C2 is charged and discharges at a CR time constant determined by resistance values of resistor elements R4 to R6 and a capacitance value of capacitor C2. Consequently, a voltage of connection node ND2 varies more gently than at delayed timing as compared with the voltage of node W2. Therefore, transistor Q3 receiving the voltage of connection node ND2 at its base electrode enters the ON state at timing delayed relative to rise of the voltage of node W2.

Discharge circuit 24 includes resistor element R7 and bipolar transistor Q3 serving as the switching element. Resistor element R7 and transistor Q3 are connected between node ND1 and node W1 in this order. When transistor Q3 is turned on in response to the output voltage from delay circuit 23, charges accumulated in the gate of transistor Q2 are released to ground node GND through transistor Q3. Consequently, as the gate voltage of transistor Q2 becomes equal to the ground voltage, transistor Q2 is turned off.

Capacitor 21 is a capacitor for smoothing ripple of a DC voltage rectified by transistor Q2.

An operation of DC-DC converter 1 will now be described, in contrast with a circuit in a comparative example.

Figure 2:
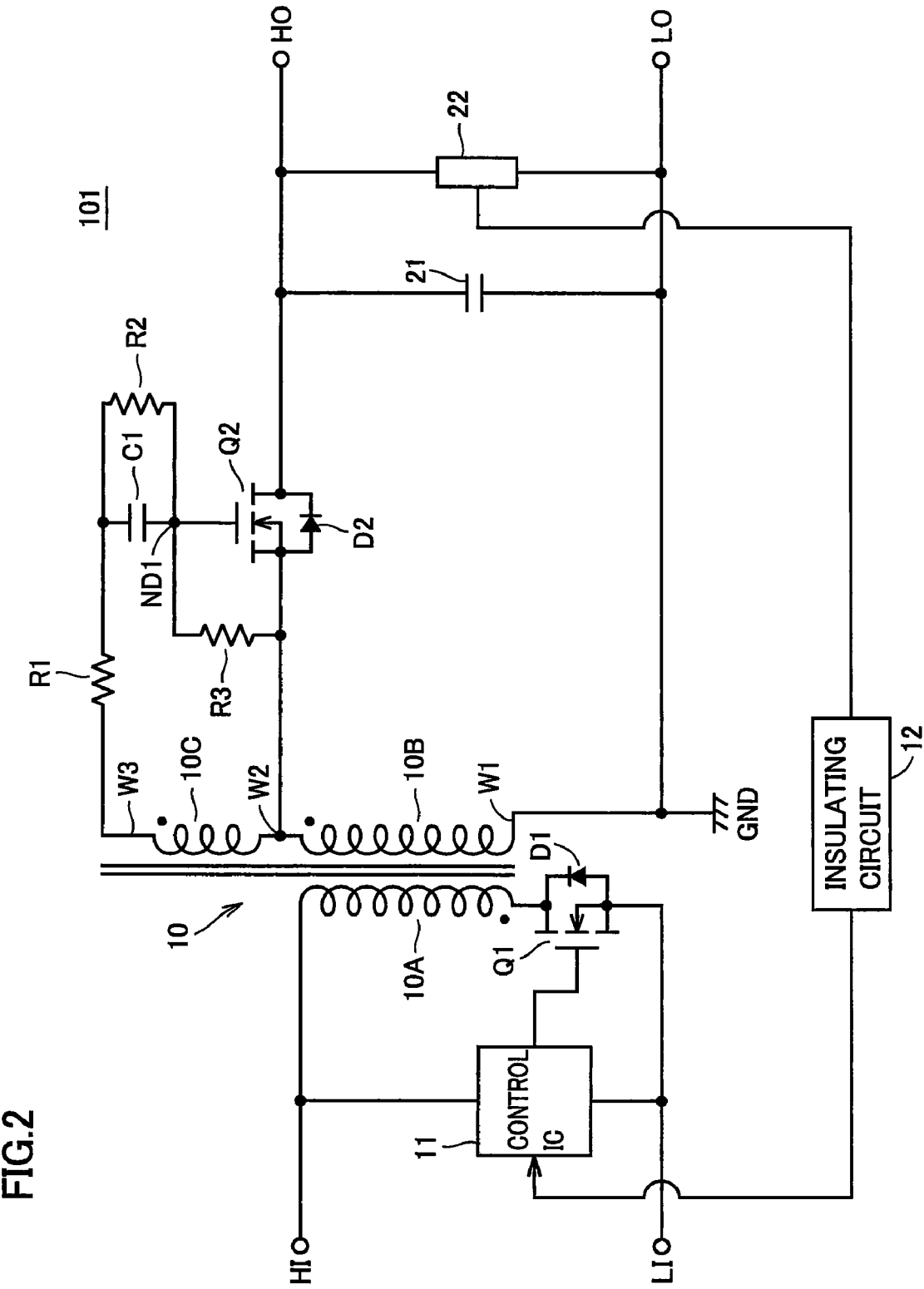
FIG. 2 is a circuit diagram showing a configuration of a DC-DC converter 101 representing a comparative example of DC-DC converter 1 in FIG. 1.

FIG. 2 is a circuit diagram showing a configuration of a DC-DC converter 101 representing a comparative example of DC-DC converter 1 in FIG. 1. Referring to FIG. 2, DC-DC converter 101 is different from DC-DC converter 1 in FIG. 1 in not including delay circuit 23 and discharge circuit 24. DC-DC converter 101 in FIG. 2 is otherwise common to DC-DC converter 1 in FIG. 1. An operation of DC-DC converter 101 in the comparative example will initially be described.

Figure 3:
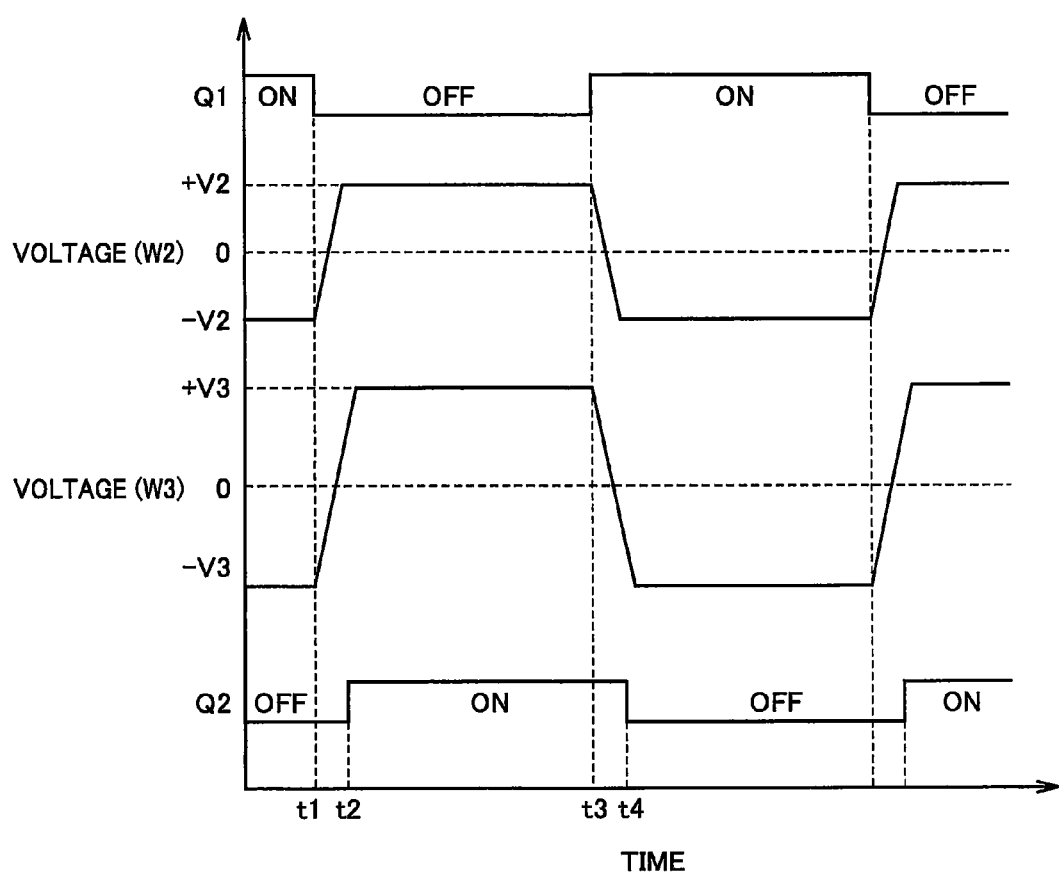
FIG. 3 is a timing chart for illustrating an operation of DC-DC converter 101 in FIG. 2.

FIG. 3 is a timing chart for illustrating an operation of DC-DC converter 101 in FIG. 2. FIG. 3 shows, from top to bottom, an ON/OFF state of transistor Q1, a waveform of a voltage of node W2, a waveform of a voltage of node W3, and an ON/OFF state of transistor Q2. The abscissa in FIG. 3 represents a time. It is noted that a voltage waveform in FIG. 3 is schematic approximation to a straight line, of a waveform that actually varies in a curve.

Referring to FIGS. 2 and 3, during a time period prior to time t1, transistor Q1 is in the ON state. Here, as a current flows in a direction from input node HI to input node LI through primary-side main winding 10A of transformer 10, a negative voltage is induced in nodes W2 and W3 on the secondary side of transformer 10.

Here, as secondary-side auxiliary winding 10C is obtained by further winding secondary-side main winding 10B, an absolute value V3 of the voltage induced in node W3 is greater than an absolute value V2 of the voltage induced in node W2. Therefore, as the gate voltage of transistor Q2 is lower than the source voltage, transistor Q2 is in the OFF state.

At time t1, transistor Q1 is switched from the ON state to the OFF state. Thus, polarity of the voltage induced in secondary-side main winding 10B and secondary-side auxiliary winding 10C is changed and the voltages of nodes W2 and W3 are raised.

At subsequent time t2, when the voltage of node W3 is raised to a voltage higher than the voltage of node W2 and the voltage across the gate and the source of transistor Q2 exceeds a threshold voltage of transistor Q2, transistor Q2 enters the ON state.

At subsequent time t3, transistor Q1 is switched from the OFF state to the ON state. Thus, polarity of the voltage induced in secondary-side main winding 10B and secondary-side auxiliary winding 10C is changed and the voltages of nodes W2 and W3 are lowered.

At subsequent time t4, when the voltage across the gate and the source of transistor Q2 is equal to or lower than the threshold voltage of transistor Q2, transistor Q2 enters the OFF state.

Thus, the timing of switching of transistor Q2 is delayed relative to the timing of switching of transistor Q1. Therefore, during a period from time t3 to t4, both of transistors Q1 and Q2 are in the ON state. As this state is the same as a short-circuited state of the secondary-side circuit, a flow-through current flows through the rectifier MOSFET. In order to prevent the flow-through current, DC-DC converter 1 in the first embodiment in FIG. 1 is additionally provided with delay circuit 23 and discharge circuit 24.

Figure 4:
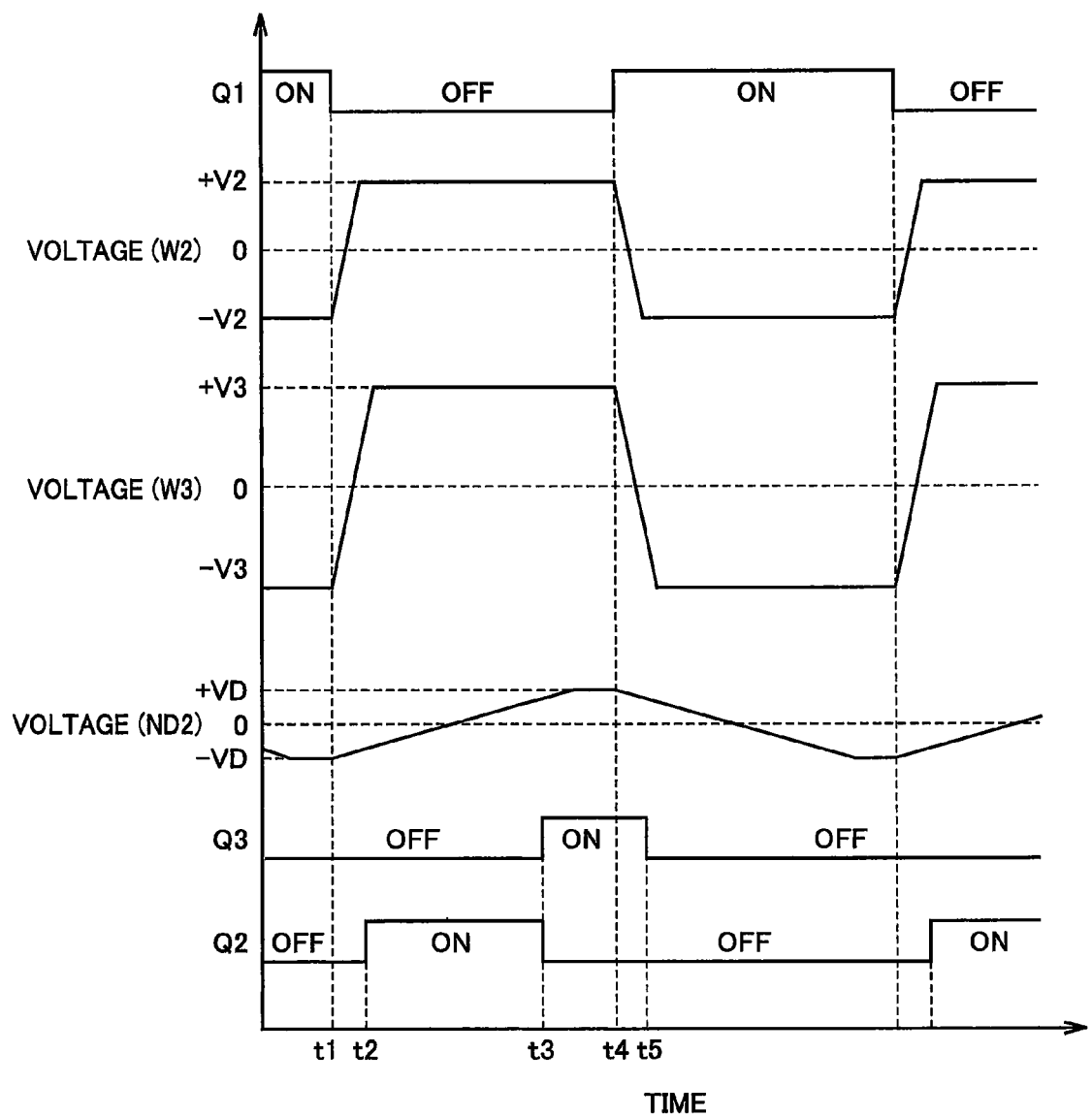
FIG. 4 is a timing chart for illustrating an operation of DC-DC converter 1 in FIG. 1.

FIG. 4 is a timing chart for illustrating an operation of DC-DC converter 1 in FIG. 1. FIG. 4 shows, from top to bottom, an ON/OFF state of transistor Q1, a waveform of a voltage of node W2, a waveform of a voltage of node W3, a waveform of a voltage of node ND2, an ON/OFF state of transistor Q3, and an ON/OFF state of transistor Q2. The abscissa in FIG. 4 represents a time. It is noted that a voltage waveform in FIG. 4 is schematic approximation to a straight line, of a waveform that actually varies in a curve.

Referring to FIGS. 1 and 4, during a time period prior to time t1, transistor Q1 is in the ON state, and therefore, a negative voltage is induced in nodes W2 and W3 on the secondary side of transformer 10. Therefore, a negative voltage (−VD) is induced also in node ND2 and both of transistors Q2 and Q3 are in the OFF state.

At time t1, transistor Q1 is switched from the ON state to the OFF state. Thus, polarity of the voltage induced in secondary-side main winding 10B and secondary-side auxiliary winding 10C is changed and the voltages of nodes W2 and W3 are raised.

At subsequent time t2, when the voltage of node W3 is raised to a voltage higher than the voltage of node W2 and the voltage across the gate and the source of transistor Q2 exceeds a threshold voltage of transistor Q2, transistor Q2 enters the ON state.

On the other hand, the voltage of node ND2 of delay circuit 23 is gently raised in accordance with the CR time constant. At subsequent time t3, when the voltage of node ND2 is raised to a value exceeding the threshold voltage of transistor Q3, transistor Q3 enters the ON state. Thus, as charges in the gate electrode of transistor Q2 are released, transistor Q2 quickly enters the OFF state.

At subsequent time t4, transistor Q1 is switched from the OFF state to the ON state. Thus, polarity of the voltage induced in secondary-side main winding 10B and secondary-side auxiliary winding 10C is changed and the voltages of nodes W2 and W3 are lowered. Accordingly, the voltage of node ND2 is also lowered, and when the voltage of node ND2 is equal to or lower than the threshold voltage of transistor Q3 at time t5, transistor Q3 is turned off. On the other hand, as transistor Q2 was already switched to the OFF state at time t3, transistor Q2 remains in the OFF state.

Thus, in DC-DC converter 1 in the first embodiment where simplified circuits of delay circuit 23 and discharge circuit 24 have been added to DC-DC converter 101 in the comparative example, transistor Q2 for synchronous rectification is turned off at the timing earlier than the timing of turn-on of transistor Q1 on the primary side. Consequently, a flow-through current generated due to delay in the timing of turn-off can be prevented. In addition, the timing of turn-off of transistor Q2 can readily be adjusted based on resistance values of resistor elements R4 to R6 constituting delay circuit 23 and a capacitance value of capacitor C2 constituting delay circuit 23.

Though the flyback type DC-DC converter 1 has been described in the first embodiment by way of example, a method in the first embodiment is applicable also to a switching element for synchronous rectification used in a DC-DC converter of another type such as a forward type.

In addition, in DC-DC converter 1 described above, transistor Q1 on the primary side is switched under PWM control by control IC 11, however, a self-excited oscillation type converter such as RCC (Ringing Choke Converter) may alternatively be employed.

[Second Embodiment]

Figure 5:
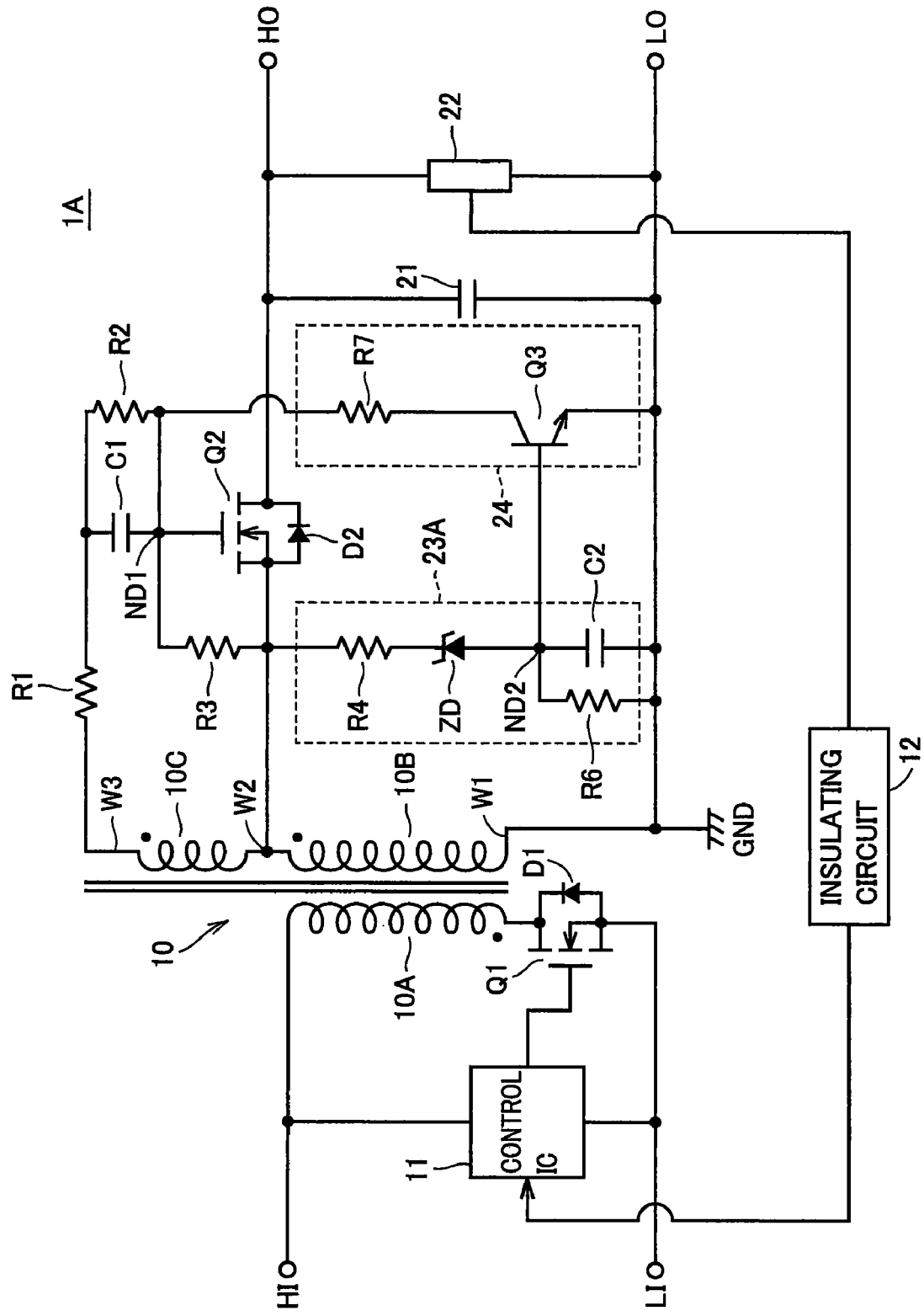
FIG. 5 is a circuit diagram showing a configuration of a synchronous rectification DC-DC converter 1A according to a second embodiment of the present invention.

FIG. 5 is a circuit diagram showing a configuration of a synchronous rectification DC-DC converter 1A according to a second embodiment of the present invention. A delay circuit 23A in FIG. 5 is different from delay circuit 23 in FIG. 1 in including a Zener diode ZD instead of resistor element R5 in FIG. 1. As shown in FIG. 5, Zener diode ZD has an anode connected to node ND2 and a cathode connected to node W2 with resistor element R4 being interposed. As DC-DC converter 1A in FIG. 5 is otherwise common to DC-DC converter 1 in FIG. 1, the same or corresponding portion has the same reference character allotted and the description will not be repeated.

As described with reference to FIGS. 1 and 4, as transistor Q1 on the primary side of transformer 10 is switched from the ON state to the OFF state, the voltage of node W2 starts to rise. Here, in the case of DC-DC converter 1A in FIG. 5, the voltage of node ND2 does not rise until the voltage of node W2 exceeds a Zener voltage of Zener diode ZD. Consequently, in the case of FIG. 5, voltage increase of node ND2 can be delayed as compared with the case of FIG. 1.

On the other hand, when transistor Q1 is switched from the OFF state to the ON state, the voltage of node W2 starts to lower. Here, charges accumulated in capacitor C2 are released through Zener diode ZD. Here, as a forward drop voltage of Zener diode ZD is smaller than voltage lowering of the resistor element, capacitor C2 can quickly be discharged than in the first embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A synchronous rectifier circuit, comprising:
   first and second input terminals;
   first and second output terminals;
   a transformer including first and second nodes, a primary-side main winding, provided between said first and second input terminals, a secondary-side main winding provided between said second output terminal and said first node, and a secondary-side auxiliary winding provided between said first and second nodes and wound in a direction identical to a direction of winding of said secondary-side main winding;
   a first switching element provided between said first and second input terminals and connected in series to said primary-side main winding;
   a second switching element for rectification provided between said first node and said first output terminal, said second switching element having a control electrode for receiving a voltage of said second node generated by switching of said first switching element or a voltage obtained by dividing the voltage of said second node and being turned on in response to the voltage of said second node;
   a delay circuit for receiving a voltage of said first node generated by switching of said first switching element; and outputting a voltage that varies at delayed timing as compared with the voltage of said first node; and
   a third switching element provided between the control electrode of said second switching element and said second output terminal, said third switching element having a control electrode for receiving the output voltage from said delay circuit and being turned on in response to the output voltage from said delay circuit,
   said second switching element being turned off in response to turn-on of said third switching element,
   said delay circuit includes a capacitive element and a Zener diode,
   said capacitive element and said Zener diode are provided in series between said second output terminal and said first node in this order, and
   a connection node of said capacitive element and said Zener diode is connected to the control electrode of said third switching element.

* * * * *